R. B. OLDER.
AUTOMOBILE BUMPER.
APPLICATION FILED MAR. 23, 1921.
1,425,272.
Patented Aug. 8, 1922.
2 SHEETS—SHEET 1.
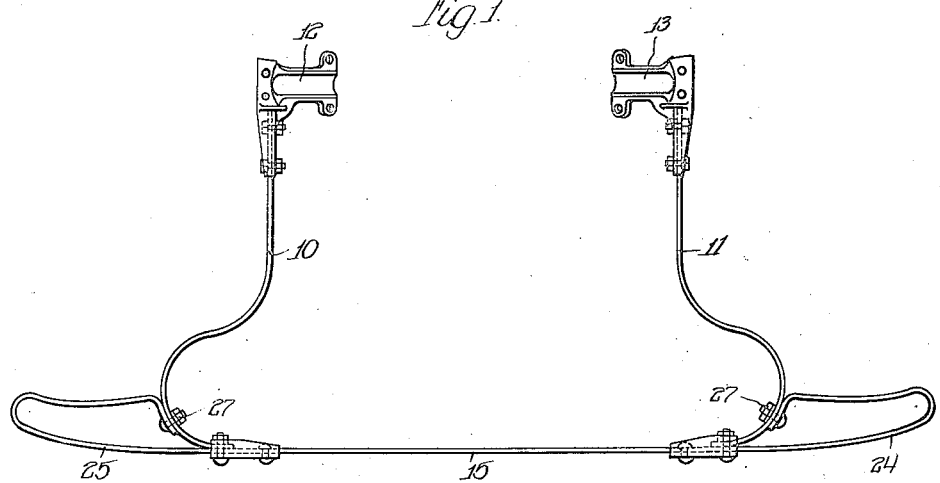
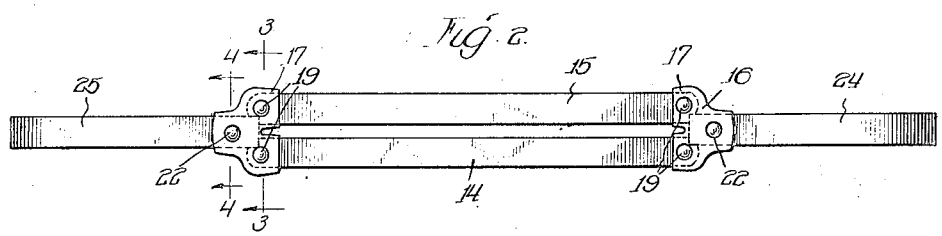
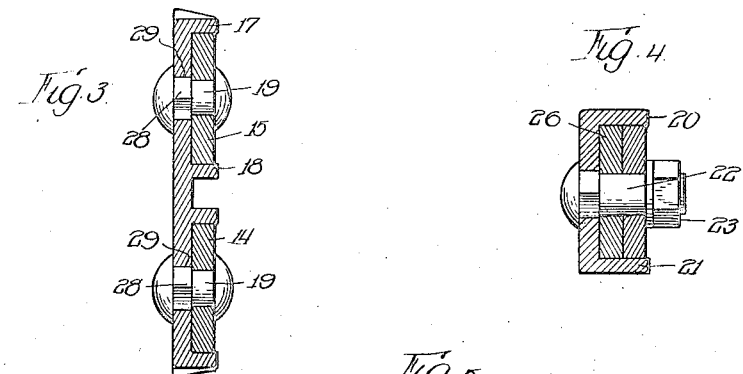
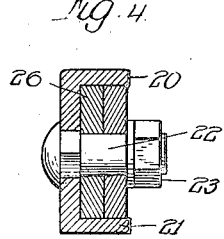
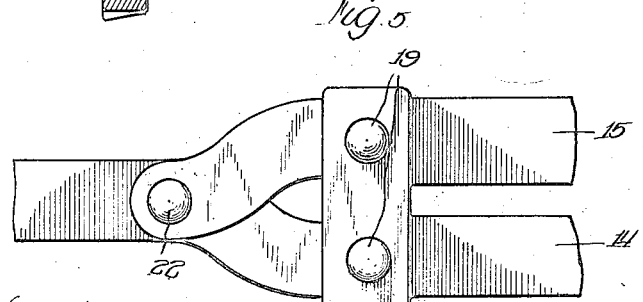
Witness:
R Burkhardt
Inventor:
Roy B. Older.

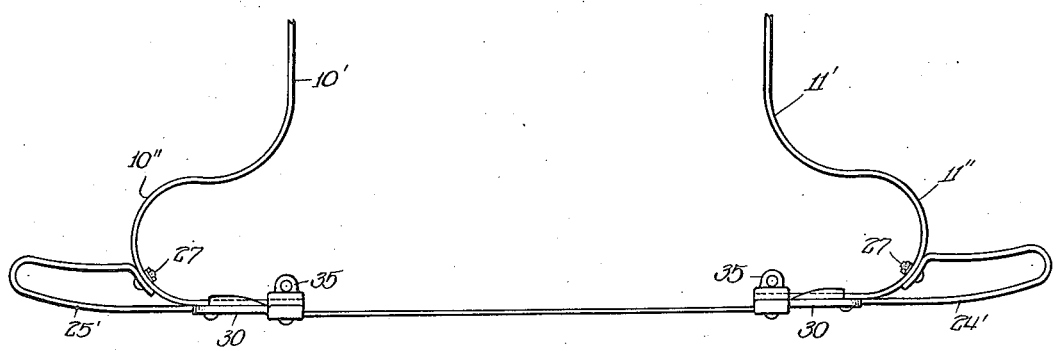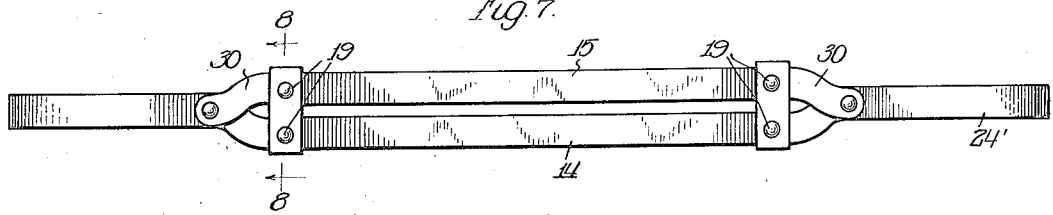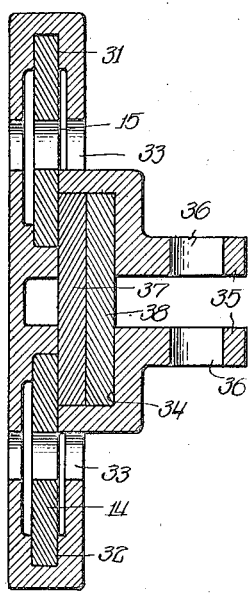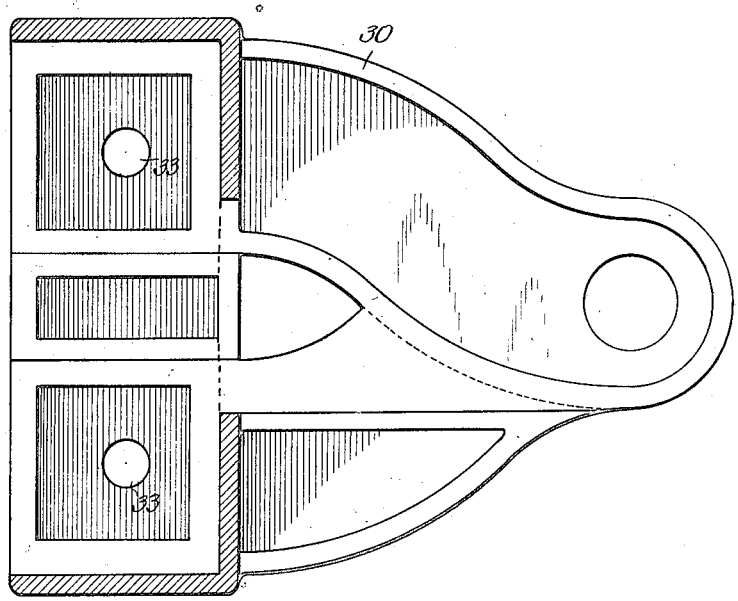

UNITED STATES PATENT OFFICE.

ROY BURTON OLDER, OF DANVILLE, ILLINOIS, ASSIGNOR TO ALLITH-PROUTY COMPANY, OF DANVILLE, ILLINOIS, A CORPORATION OF ILLINOIS.

AUTOMOBILE BUMPER.

1,425,272.   Specification of Letters Patent.   Patented Aug. 8, 1922.

Application filed March 23, 1921. Serial No. 454,752.

*To all whom it may concern:*

Be it known that I, ROY B. OLDER, a citizen of the United States, residing at Danville, in the county of Vermilion and State of Illinois, have invented certain new and useful Improvements in Automobile Bumpers, of which the following is a specification.

My invention relates to automobile bumpers.

This invention relates preferably to automobile bumpers having impact receiving portions and attaching members formed of flat metal bars or strips arranged with the bars in vertical position so that the bumpers may be horizontally yieldable while vertically rigid.

An object of my invention is to provide an automobile bumper from flat metal strips which may be economically manufactured and which may be shipped in a compact form.

Another object of the invention is to provide an automobile bumper of flat metal strips which will be rigid when in place on an automobile and which may be shipped in knocked down condition in compact form.

A further object of the invention is to provide a bumper of the class described for successful commercial manufacture and use.

Generally speaking I carry out the preferred embodiment of my invention by providing a bumper comprising a plurality of elements which may be shipped in compact form and readily assembled into an efficient, rigid spring bumper.

The various novel features of my invention will be apparent from the following specification and drawings and will be particularly pointed out in the appended claims.

In the accompanying drawings:

Figure 1 is a plan view of a bumper constructed in accordance with my invention and shown in assembled position.

Figure 2 is a front elevation of the bumper of Figure 1.

Figure 3 is a vertical section on line 3—3 of Figure 2.

Figure 4 is a vertical section on line 4—4 of Figure 2.

Figure 5 is an enlarged elevational view of a modified form of clip.

Figure 6 is a plan view of a bumper similar to that shown in Figure 1, but showing certain modifications.

Figure 7 is a front elevation of the bumper of Figure 6.

Figure 8 is an enlarged vertical section thereof, taken on line 8—8 of Figure 7, and Figure 9 is a rear elevational view of the clip shown in the present modifications.

The bumper comprising my invention includes two forwardly projecting members 10 and 11 which are made of flat metal and are preferably goose neck in plan. The rear ends of these members are adapted for attachment to a vehicle by any well known means as for instance, by bolting the ends of the members 10 and 11 to the vehicle frame or to brackets 12 and 13 which may be rigidly secured to some part of the vehicle. The impact receiving portion of the bumper of my invention includes a plurality of vertically spaced horizontally disposed parallel bars and in the embodiment shown two such bars 14 and 15 are disclosed, and which bars are straight throughout their length. These bars as well as the attaching members 10 and 11 are made of spring metal and are arranged in edgewise position for the purpose of being resilient horizontally and rigid vertically. Secured to the ends of the bars 14 and 15 are what I term clips 16 which are preferably castings and are formed with the outer or front surface smooth and with seats on the rear sides which are defined by marginal flanges 17 and 18 and which in outline are substantially Y shaped. The seats formed by these flanges in Figure 3 are adapted to receive the ends of the bars 14 and 15 which bars are securely fastened thereto by means of rivets 19 or similar attaching means.

Referring to Figure 4 it will be noted that the width of clips is reduced at this section while the flanges 20 and 21 are increased so as to receive two thicknesses of the flat bars. The bars are secured to this portion of the clip preferably by bolts 22 and nuts 23. The seats formed in the rear side of the clip are of such nature that there will be no overlapping of the bars 14 and 15 with respect to the attaching members 10 and 11. Extending outwardly of the clips 16 are wheel protecting members 24 and 25 which are made in the form of loops in plan and which are adapted to extend in front of the vehicle wheels. These members are made of flat spring metal and are arranged so that the inner ends 26 are secured in the clips 16 in the position shown in Figure 4. The outer ends of the members 24 terminate short of the clips and are secured by bolts 27 to some portion of the attaching members 10 and 11 at a point preferably intermediate the ends of said members.

The clips 16 are provided with suitable apertures for the reception of the rivets 19 and the bolts 22. I prefer to provide the rivets 19 and the bolts 22 with squared shoulders 28 and form apertures 29 in the clips 16 to conform to the shoulders 28 so that the securing members such as the rivets 19 and bolts 22 will not turn in the clips. This construction adds to the rigidity of the structure as a whole and is an advantage in eliminating vibration and looseness.

The various parts are constructed as shown. The impact bars 14 and 15 are riveted to the clips 16 at the places of manufacture. The whole bumper may be shipped in a knocked down condition and assembled in the following manner:

First of all the wheel protecting members 24 and 25 are placed in position in the clips 16 as indicated in Figure 4 of the drawings. The attaching members 10 and 11 are then placed in contact with the members 25 and the bolts 22 inserted through the registering aperture in the members 25 and 10 and 11, whereupon the nuts 23 may be tightened until the members 25 and 10 and 11 are firmly secured in the clips 16. The bolts 27 are then passed through registering apertures in the ends of the members 24 and 25 and the attaching members 10 and 11. When the ends of these bolts have been tightened there is formed a rigid bumper of spring metal and one which can readily be applied to a vehicle in well known manner.

In Figure 5 I have shown a modified form of clip, the manner of attachment of this clip to the members 14, 15, 24, 25, 10 and 11 is exactly the same as with respect to the clips shown in the other figures of the drawings. Members 14 and 15 are secured thereto by rivets 19 and to the members 24 and 25, 10 and 11 by bolts 22. The seats for the flat bars of the bumper are formed in the rear side of the clips 25 in the same manner as in the clips 16, the only difference being that of appearances as in some cases the matter of appearances is to be considered.

The modifications shown in Figures 6 through 9, include an impact receiving portion comprising vertically spaced, horizontally arranged bumper bars 14 and 15, which are secured at their ends by means of rivets 19 to clips 30. In the modification shown herein the clips comprise a plurality of strip receiving pockets.

In Figure 8 there is shown in section top and bottom pockets 31 and 32 adapted to receive the bumper bars 15 and 14 respectively. Suitable apertures 33 being provided through which rivets or other attaching means pass.

In a plane behind the plane of the members 14 and 15 is another pocket 34, which is greater in depth than pockets 31 and 32. This pocket is formed in the stem of the Y clip and is so arranged that the longitudinal axis thereof will be intermediate similar axes of the top and bottom members 14 and 15. Rearwardly extending lugs 35 and 36 are provided each with vertically arranged registering apertures for the reception of a bolt whereby the lugs 35 and 36 may be caused to frictionally engage the strips which are in the pocket 34.

The attaching members 10' and 11' of Figure 6 are similar to 10 and 11 of Figure 1 but have the loop portions 10" and 11" deeper than the corresponding loops in members 10 and 11. The ends of these members 10' and 11' are inserted in the pocket 34 in the clips 30 and overlie the inner ends of the end loops 24' and 25'. In Figure 8 the reference character 37 indicates the position of the inner end of these end loops 24' and 25' and 38 indicates the position of the attaching end of the supporting members 10', 11'. It will be noted that the supporting members 10' and 11' and the co-operating loop 25', 24' of which are secured to the attaching members 10' and 11' by rivets or bolts 27 are movable as a unit by reason of the rear pocket 34 and the outstanding lugs 35 and 36 and the bolt cooperating with the aperture therethrough. It is possible to secure the ends of the members 10' and 11' and the loops 25', 24' carried thereby in a plurality of laterally adjusted positions, the latitude of the adjustment depending on the length of the fastened portions of the members 10' and 11' in contact with the corresponding portions of the loops 25', 24'.

It will be observed that by the construction shown in Figures 6 through 9, it is possible to provide a bumper having a double impact receiving portion and spring supporting arms which within certain limits are adjustable with respect to the impact receiving portion so that the bumpers may be applied to motor vehicles having frames of varying width.

A bumper constructed in accordance with my invention will be readily resilient horizontally and vertically rigid, the shock of the blow being taken on the impact portion which is of increased strength by reason of the plurality of impact receiving bars while some of the shock of the blow is taken in the spring attaching members 10 and 11. The wheel protecting members add additional protection from blows delivered near the wheels and by reason of the looped ends of these portions there is less likelihood of the bumper catching obstructions than there is where the ends of the wheel members are free. Furthermore, the looped end portions serve as resilient means in receiving blows, the whole bumper functioning under impact to absorb shocks and return to normal shape and position without danger to the bumper as a whole.

It may be observed that if for some reason any of the parts should be broken or damaged beyond repair it would be necessary only to replace that damaged portion of the bumper, without having to replace the bumper as a whole. Such a construction possesses advantages which are readily appreciated.

While I have described more or less precisely the details of construction of my invention I do not wish to be understood as limiting myself thereto, as I contemplate changes in form and the proportion of parts and substitution of equivalents as circumstances may suggest or render expedient, without departing from the spirit of my invention.

I claim:

1. An automobile bumper comprising an impact receiving portion and members for attaching said bumper to a vehicle, said impact receiving portions comprising a pair of vertically spaced parallel bars, clips rigidly secured to the ends of said bars, other members secured to and extending outwardly from said clips, and means engaging said other members and said attaching members for securing the same to said clips.

2. An automobile bumper comprising an impact receiving portion formed of a plurality of horizontally disposed flat bars in parallel relation, a clip at each end of said portion, a substantially closed loop extending outwardly from each of said clips and in front of the vehicle wheels, and means for attaching said bumper to a vehicle comprising rearwardly extending resilient strips of goose neck form with the forward ends thereof secured to said clips.

3. An automobile bumper comprising a plurality of members made of flat metal strips, including in combination, an impact receiving portion comprising a plurality of said strips arranged in horizontal disposition and in vertically spaced relation, substantially Y shaped clips having the branch members thereof rigidly secured to the ends of said spaced bars, end loop portions extending in substantially the plane of said impact receiving portion and having ends mounted in the stems of the Y brackets, members for attaching said bumper to a vehicle, said members having the front ends thereof bent to contact flatwise the inner ends of said loop portions in superimposed relation, and means passing through the stem of said brackets and said overlapping loops and attaching members for removably connecting said parts together.

4. An automobile bumper comprising a plurality of members made of flat metal strips, including in combination an impact receiving portion comprising a plurality of said strips arranged in horizontal disposition and in vertically spaced relation, substantially Y shaped clips having the branch members thereof irremovably secured to the ends of said spaced bars, end loop portions extending substantially in the plane of said impact receiving portions and each having an end mounted in the stem of the Y clips, members for attaching said bumper to a vehicle having the front ends thereof bent to contact with the inner ends of said loop portions in superimposed relation, and means passing through said stem of said bracket and said overlapping loops and attaching members for removable connection to said bracket, and means for fastening the other ends of said loops to said attaching members.

5. An automobile bumper comprising a plurality of members formed of flat metal strips, including in combination an impact receiving portion comprising a plurality of said strips arranged in horizontal disposition and in vertically spaced relation, substantially Y shaped clips having the branch members thereof irremovably secured to the ends of said spaced bars, end loop portions extending in substantial alignment with said impact receiving portions and having an end mounted in the stem of the Y bracket, members for attaching said bumper to a vehicle having the front ends thereof bent to contact the inner ends of said loop portions in superimposed relation, and means passing through said stem of said bracket and said overlapping loops and attaching members for removable connection thereto, and means for fastening the other ends of said loops to said attaching members intermediate the ends thereof.

6. In an automobile bumper, a clip having a portion to be rigidly secured to one part of the bumper, and another portion adapted to be frictionally secured to another part of the bumper.

7. An automobile bumper comprising, in combination, a plurality of horizontally disposed vertically spaced parallel strips, and substantially Y shaped clips rigidly attached to the ends of said strips for uniting the same in a readily portable unitary structure, said clips being adapted for co-operation with means for applying said bumper to a vehicle.

8. An automobile bumper comprising, in combination, an impact portion formed of a plurality of horizontally disposed vertically spaced parallel strips, substantially Y shaped clips fastened to the ends of said strips for securing the same in a unitary structure, and means co-operating with said clips for securing said structure to a vehicle.

Signed at Danville, Illinois, this 17th day of March, 1921.

ROY BURTON OLDER.